Dec. 26, 1933.  E. S. SMITH, JR  1,940,921
EXPANSIBLE FLUID METER
Filed Jan. 7, 1931  2 Sheets-Sheet 1
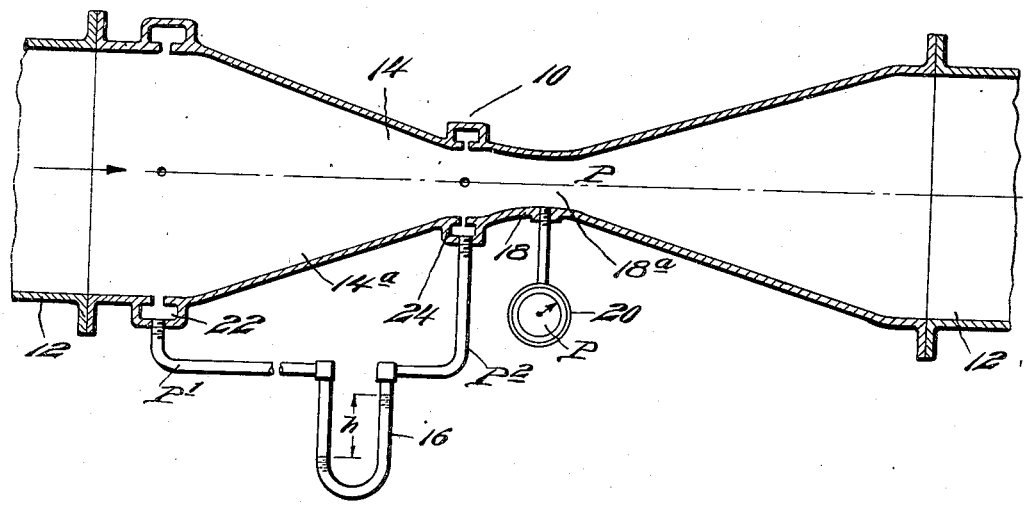
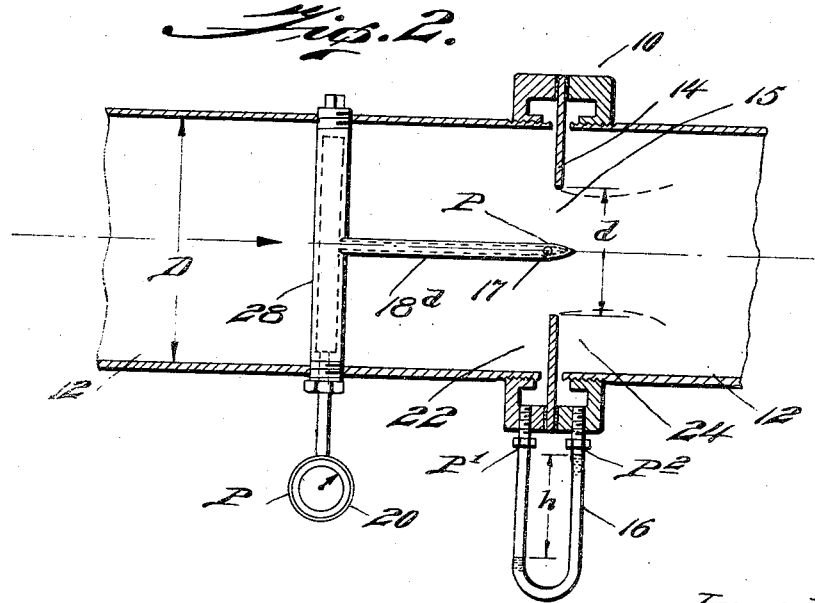
Inventor
Ed. S. Smith Jr.
By Thomas A. Jenkins
Attorney Dec. 26, 1933.  E. S. SMITH, JR  1,940,921
EXPANSIBLE FLUID METER
Filed Jan. 7, 1931  2 Sheets-Sheet 2
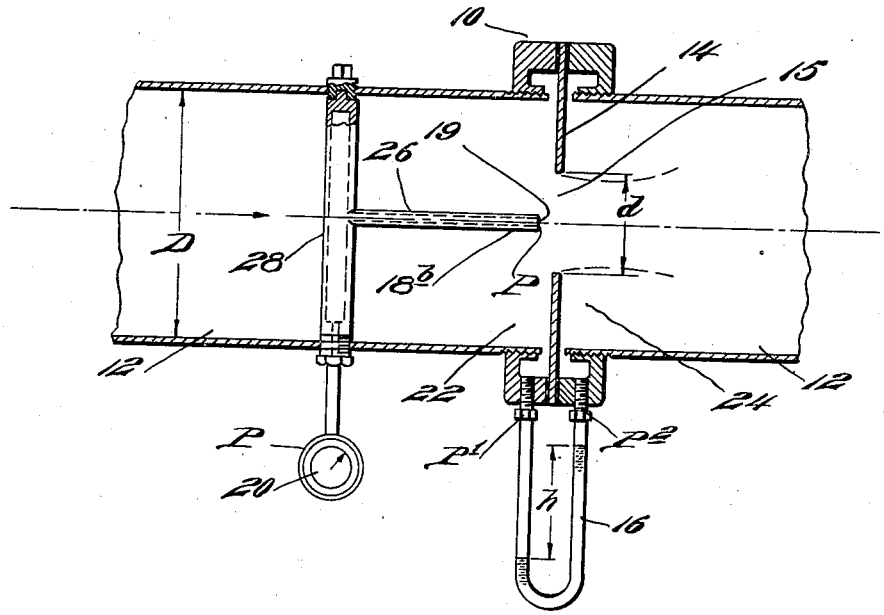
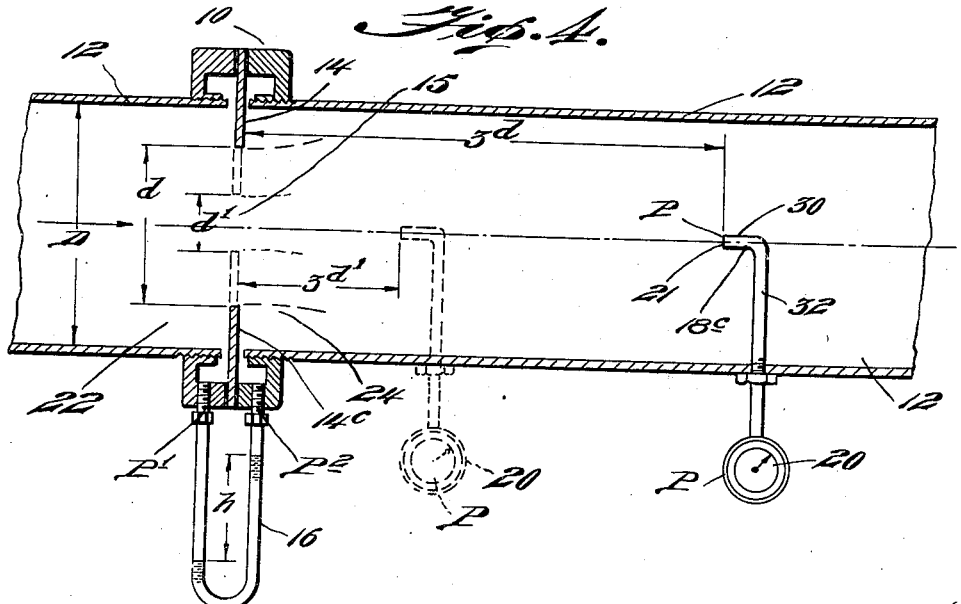
Inventor
Ed S. Smith Jr.
By Thomas A. Jenkes
Attorney Patented Dec. 26, 1933

1,940,921

UNITED STATES PATENT OFFICE 1,940,921

EXPANSIBLE FLUID METER

Ed S. Smith, Jr., Providence, R. I., assignor to Builders Iron Foundry, Providence, R. I., a corporation of Rhode Island Application January 7, 1931. Serial No. 507,206

7 Claims. (Cl. 73—167)

The object of this invention is to create a meter which is not subject to expansion errors, such as ordinary Venturi and orifice meters have been when measuring gaseous fluid.

The applicant is aware that others have had the kinetic effect of the flow modify the absolute pressure so that the product of the square root of the differential and absolute pressure contains only a simple correction for the expansibility and is further aware that the Venturi meter fairly closely approximates this ideal when the down stream pressure is used in connection with the differential, that is, the flow quantity-rate is somewhat approximately proportional to the square root of the product of the differential by the absolute pressure.

However, the applicant for the first time has actually modified the differential producer to be acted upon the flow in the conduit in such a way as to create for the first time an absolute pressure which is accurately of such a magnitude as to practically exactly correct for the departure of the differential from the square root relation due to expansibility errors. The writer has extended this conception to usual orifice meters which are very generally used for metering gases so that he uses exactly the proper absolute pressure for the first time, whereas others have only succeeded in making approximations thereto.

Further objects of my invention are to provide an improved type of meter for this purpose, which is very easy to construct, simple and fool-proof in its operation and which presents the cheapest possible type of indicator to be used in connection therewith, i. e., one without any expansion corrector in the indicating mechanism.

An additional object of my invention is to create an accurate meter which will be corrected for absolute pressure automatically at all commercially practicable differentials.

A further specific object of my invention is to provide a Venturi tube having a modified pressure connection for this purpose. Another object of my invention is to provide a specific form of pressure connection to be used in connection with orifices, whereby the simple square root relation is obtained.

In general the objects of my invention are to provide apparatus for modifying the absolute pressure in the main flow stream so that the quantity-rate of flow is directly proportional to the square root of the product of the pressure differential and said modified absolute pressure.

These and such other objects of my invention as may hereinafter appear will be best understood from a description of the accompanying drawings which illustrate various embodiments thereof.

In the drawings, Fig. 1 is a diagrammatic sectional view of a Venturi tube suitably modified to carry out the teachings of my invention.

Fig. 2 is a diagrammatic sectional view of an orifice type of differential producer having a side wall Pitot located therein to obtain the desired modified absolute pressure.

Fig. 3 is a diagrammatic sectional view of an orifice type of differential producer having a trailing Pitot tube located therein to obtain the desired modified absolute pressure.

Fig. 4 is a diagrammatic sectional view of a different embodiment of my invention, also employing a novel type of differential producer, comprising an impact Pitot tube suitably located in the conduit to obtain the desired modified absolute pressure.

In the drawings, wherein like characters of reference indicate like parts throughout, 10 generally indicates an expansible fluid meter constructed in accordance with the teachings of my invention. Said meter includes a conduit 12, a pressure differential producer 14 interposed in said conduit, suitable means 16 to indicate the differential produced thereby, means 18 to modify the absolute pressure in said conduit suitably located for this purpose and means 20 to measure said modified absolute pressure.

In the embodiment of my invention shown in Fig. 1 the differential producer comprises the usual upstream cone 14$^a$ of a Venturi meter tube, with suitable indicating means 16 therefor being suitably connected to the upstream end 22 and the usual throat 24 thereof in the usual manner. In the embodiment shown in Fig. 1 the means I employ to modify the absolute pressure in said conduit includes a supplemental restricted throat 18$^a$. In Venturi meter tubes the pressure $P_1$ at the upstream end and the pressure $P_2$ at the throat are both too high to give the desired absolute pressure and to achieve the desired modified absolute pressure with the usual diameter ratio. I thus provide the further restricted throat 18$^a$ of such a size to modify the absolute pressure in the desired manner. In Venturi tubes the differential normally does not follow the square root law with expansible fluids but reads too high. The P obtained from 18$^a$ and measured at 20 is sufficiently lowered to compensate for the extra height of $h$ which is namely the differential as measured by 16 and which extra height is due to the expansion effect of gaseous fluid while passing through the Venturi tube. The expansion effect in Venturi meters is based on the formula $$Q \alpha Y_1 \sqrt{hP_1} \text{ or } Q \alpha Y_2 \sqrt{hP_2},$$

where Q equals the volume rate of flow, $Y_1$ the expansion factor based on the inlet pressure based on the differential pressure in inches of water, $P_1$ is the absolute pressure at the inlet and $Y_2$ and $P_2$ respectively are the corresponding expansion factor and absolute pressure for the downstream, and where $h$=the measured differential varied from a true differential by the expansibility of the fluid being metered and this effect is well known by experimentation and theoretical considerations. However Q can be made to be proportional to $h \, p$ applying the P obtained at $18^a$. Thus $$Q \alpha \sqrt{hP}.$$

This gives an unimpeachable basis for fluid flow measurement of expansible fluids.

In the embodiment shown in Fig. 2, accepting the usual pressure differential $h$, the upstream pressure $P_1$, is too high while the downstream pressure $P_2$ is too low to obtain the relation $$Q \alpha \sqrt{hP_1} \text{ or } Q \alpha \sqrt{hP_2}.$$

However the proper modified pressure can be simply obtained by locating an absolute pressure connection opening 17 at a suitable point on the axis of the conduit. It is obvious that the absolute pressure is used with the side wall opening 17 in the trailing hollow axial pipe $18^d$ without "kinetic" effects due to impingement of the flow upon the opening 17 by locating it at substantially the upstream edge of the orifice 15. This pressure P at 17 is such that $$Q \alpha \sqrt{hP},$$

and is transmitted through the trailing pipe $18^d$ suitably mounted upon the hollow diametric pipe 28 which leads to the pressure measuring means 20. Experimentation shows high accuracy but the trailing pipe $18^d$ and pressure opening 17 must be so located as to interfere with changing the orifice plate 14, thus providing practical structural difficulties.

The embodiments shown in Figs. 3 and 4 illustrate an orifice type of differential producer. In this type of meter any suitable type of orifice plate 14 may be employed. As usual the orifice 15 produces the differential and the usual indicating means 16 is attached to the upstream side 22 of said orifice plate 14 and also to the downstream side 24 thereof. With orifice plates, the upstream pressure $P_1$ is too high to give the true square root relationship accepting the $h$ produced by the orifice and the down stream pressure $P_2$ is too low to give the true square root relationship accepting the same $h$. Realizing this in the embodiment shown in Fig. 3, I provide means to secure the desired modified absolute pressure which means is effective to lower $P_1$ to the desired modified absolute pressure. In the embodiment shown in Fig. 3, said means comprises the trailing Pitot tube $18^b$ having the trailing orifice 19 therein. The opening 19 is open at a point slightly above the orifice 15. In practice I have found where $d$ equals the diameter of the orifice 15 that the distance of the opening 19 in said orifice 15 is preferably substantially $d/12$. The trailing Pitot $18^b$ is provided with the usual hollow center portion both in the axial arm 26 and in its diametric supporting arm 28 thereof thus enabling the pressure to be led through the hollow arms 26 and 28 respectively to the pressure measuring means 20.

As stated hitherto when the orifice 15 is employed as shown in both Figs. 3 and 4 the $P_2$ namely the down stream pressure below the orifice plate is normally too low to give the desired absolute presure, to correct for the true quantity rate of flow. Thus in the embodiment shown in Fig. 4, I provide suitable means to raise the pressure $P_2$ downstream of said orifice to the desired pressure P and for this purpose I provide an impact Pitot tube $18^c$ having an opening 21 facing upstream towards said orifice 15. Said opening 21 is at the upstream end of a relatively short axial hollow arm 30 connected to a suitable radial hollow arm 32 which in turn is connected to the pressure measuring means 20. I have found in practice that in order to achieve the desired modified pressure, the opening 21 is preferably spaced a distance from the orifice 15 substantially three times $d$ where $d$ is the diameter of the orifice 15 and I have shown in $d'$ in dotted line position an orifice 15 and the impact Pitot tube $18^c$ employed where $x$ there is a different diameter of the orifice 15 in the orifice plate 14. It is obvious that at every point within a closed conduit of finite diameter the absolute pressure is somewhat affected by the velocity or kinetic action of the fluid flowing through the conduit, consequently a common term "static" which refers to a stationary pressure can hardly be strictly applied. Recapitulating therefore if the upstream pressure be employed in connection with the differential the result will be too high, whereas if the downstream pressure be employed with the differential the result will be too low. The object of my invention therefore is to create a pressure by the flow which will give the right result. When employing the inlet pressure, a Pitot tube may be trailed to decrease the pressure to the proper value (as in Fig. 3), whereas in Fig. 4 the downstream pressure being too low, it is necessary to have the Pitot tube impact the stream so that the proper pressure may be obtained. In Fig. 2 the pressure is taken midway between the upstream and downstream, thus obtaining the proper pressure without correcting.

I have found in practice however, that the embodiment shown in Fig. 3 employing a trailing Pitot is considerably more desirable than the embodiment shown in Fig. 4 for the reason that the trailing Pitot tube functions all right despite the diameter or size of the orifice 15 without moving it as it is necessary employing the impact Pitot tube shown in Fig. 4. In the embodiment shown in Fig. 4, moreover the impact orifice 21 is apt to become filled with dust, whereas in the trailing orifice shown in Fig. 3 experience shows that in practice it does not collect dust therein so that no trouble is experienced due to deposition of dust or other particles thereon. Considerable advantages exist in the embodiment shown in Fig. 3 as compared with the former method of employing the mean pressure $(P_1+P_2)/2$ so that the embodiment shown in Fig. 3 gives a pressure which is demonstrated by actual experiment with air to be correct for all orifice ratios, $d/D$ up to 0.75, where $d$ equals the diameter of the orifice 15 and D equals the diameter of the conduit 12.

It is apparent therefore that I have provided various improved types of novel expansible fluid meters which operate to modify the absolute pressure so as to produce a modified absolute pressure P which when multiplied by the usual differential h shown, will give a true square root relationship with the quantity-rate of flow. In other words I have modified $P_1$, or $P_2$ by providing an apparatus which will modify $P_1$ or $P_2$ into the desired P by the kinetic action of the flow itself, and thereby provide such a P so that $$Q \alpha \sqrt{hP}.$$

Experiment has shown that the effective area 15 of the orifice must be corrected by the area of the end of the trailing Pitot $18^b$ since in actual practice the effective area of the orifice 15 is very slightly lessened by the cross sectional area of the trailing Pitot $18^b$.

It is understood that my invention is not limited to the specific embodiments shown and that various deviations may be made therefrom without departing from the spirit and scope of the appended claims.

What I claim is:

1. In an expansible fluid meter, for a conduit, in combination, a Venturi tube in said conduit to produce a pressure differential h by the main flow in said conduit and a supplemental restricted throat for said venturi, adapted to modify the absolute pressure in said conduit and so placed that with the modified pressure P produced by the flow therethrough the quantity rate of flow $$Q \alpha \sqrt{hP}.$$

2. In an expansible fluid meter, for a conduit, in combination, a Venturi tube in said conduit, to produce a pressure differential by the main flow in said conduit, means to measure the differential h produced by said Venturi tube, and a supplemental restricted throat for said venturi, adapted to modify the absolute pressure in said conduit and so placed that with the modified pressure P produced by the flow therethrough the quantity rate of flow $$Q \alpha \sqrt{hP}.$$

and means to measure said pressure P.

3. In an expansible fluid meter, for a conduit, in combination, an orifice plate in said conduit to produce a pressure differential h by the main flow in said conduit and a trailing Pitot tube having the opening thereof located slightly upstream of said orifice whereby the kinetic action of the flow may modify the absolute pressure in said conduit and so placed that with the modified pressure P produced by the flow the quantity rate of flow $$Q \alpha \sqrt{hP}.$$

4. In an expansible fluid meter, for a conduit, in combination, an orifice plate in said conduit to produce a pressure differential by the main flow in said conduit, means to measure the differential h produced thereby and a trailing Pitot tube having the opening thereof located slightly upstream of said orifice whereby the kinetic action of the flow may modify the absolute pressure in said conduit, said Pitot tube being so placed that with the modified pressure P produced by the flow the quantity rate of flow $$Q \alpha \sqrt{hP}.$$

and means to measure said pressure P.

5. In an expansible fluid meter, for a conduit, in combination, an orifice plate in said conduit to produce a pressure differential by the main flow in said conduit and an impact Pitot having the opening thereof located at substantially three times the diameter of said orifice below said orifice whereby the kinetic action of the flow may modify the absolute pressure in said conduit, said Pitot tube being so placed that with the modified pressure produced by the flow the quantity rate of flow will vary as the square root of the measured pressure differential times the modified pressure.

6. In an expansible fluid meter of the pressure differential responsive type for a conduit having a flow of fluid therethrough, a single means in said conduit to produce a pressure differential responsive to said rate of flow therethrough varying from the true square of the flow-rate relationship due to the expansion of the fluid in the conduit, an auxiliary absolute pressure modifying means located at a point in said conduit, said last mentioned means being constructed and/or located to modify the absolute pressure by the kinetic action of the flow through said conduit from the true absolute pressure so that the square root of the product of the differential and the compensated absolute pressure varies directly with the flow-rate, means to measure said pressure differentials and means to measure said modified absolute pressure so that the product of the square root of said pressure differential and said modified absolute pressure may give an indication of the true flow-rate of fluid in said conduit.

7. In an expansible fluid meter of the pressure differential type for a conduit having a flow Q of fluid therethrough, a single means in said conduit to produce a pressure differential h responsive to the rate of flow therethrough and a pressure connection located at a point in said conduit where the absolute pressure P is so modified by the kinetic action of the main flow through said conduit that the quantity rate of flow in said conduit $$Q \alpha \sqrt{hP},$$

means to measure said pressure differential h, and means to measure said pressure P.

ED S. SMITH, Jr.